United States Patent [19] [11] Patent Number: 5,983,144
Bonissone et al. [45] Date of Patent: Nov. 9, 1999

[54] SYSTEM AND METHOD FOR TUNING LOOK-AHEAD ERROR MEASUREMENTS IN A RAIL-BASED TRANSPORTATION HANDLING CONTROLLER

[75] Inventors: Piero Patrone Bonissone, Schenectady; Yu-To Chen, Niskayuna; Pratap Shankar Khedkar, Niskayuna, all of N.Y.

[73] Assignee: General Electric Company, Schenectady, N.Y.

[21] Appl. No.: 08/999,201

[22] Filed: Dec. 29, 1997

[51] Int. Cl.$^6$ .................................................. G06F 165/00
[52] U.S. Cl. ........................ 701/19; 701/20; 364/148.05; 246/182 R
[58] Field of Search .................................. 701/1, 19, 20, 701/70; 246/2 R, 6, 182 R, 182 A, 182 B, 182 AB; 364/148.01, 148.05, 153

[56] References Cited

U.S. PATENT DOCUMENTS

| | | | |
|---|---|---|---|
| 4,041,283 | 8/1977 | Mosier | 701/20 |
| 4,401,035 | 8/1983 | Spigarelli et al. | 701/20 |
| 5,053,964 | 10/1991 | Mister et al. | 701/19 |
| 5,424,948 | 6/1995 | Jordan, Jr. | 701/70 |
| 5,541,832 | 7/1996 | Nakajima et al. | 364/153 |
| 5,758,848 | 6/1998 | Beule | 701/19 |

OTHER PUBLICATIONS

"Genetic Algorithms for Automated Tuning of Fuzzy Controllers: A Transportation Application" by Piero P. Bonissone, et al, Fifth IEEE International Conference on Fuzzy Systems, Sep. 1996, New Orleans, LA, pp. 674–680.

"Automated Fuzzy Knowledge Base Generation and Tuning" by DG Burkhardt, et al, 1992 IEEE, San Diego, CA, pp. 179–188.

"A Classified Review on the Combination Fuzzy Logic–Genetic Algorithms Bibliography" by O. Cordon, et al, Research Report DESCAI95129, Dept. of Computer Science and AI, Universidad de Granada, Granada, Spain, 1995, 21 pages.

"Tuning Fuzzy Logic Controllers by Genetic Algorithms" by F. Herrera, et al, Int. Journal Approximate Reasoning (IJAR), vol.12, Numbers 3/4, Apr./May 1995, pp.–299–315.

"Fuzzy Control of pH using Genetic Algorithms"by CL Karr, et al, IEEE Transactions on Fuzzy Systems, vol. 1. No. 1, Feb. 1993, pp. 46–53.

"Modifications of Genetic Algorithms for Designing and Optimizing Fuzzy Controllers" by J. Kinzel, et al, 1994 IEEE Conference on Evolutionary Computation, Orlando, FL, vol. 1, pp. 28–33.

"Fuzzy Identification of Systems and Its Applications to Modeling and Control" by T. Takagi, et al, IEEE Trans. on Systems, Man and Cybernetics, vol. SMC–15, No. 1, 1985, pp. 116–132.

"A Practical Guide to Tune of Proportional and Integral (PI) Like Fuzzy Controllers" by L. Zeng, 1992 IEEE Conference on Fuzzy Systems, San Diego, CA, pp. 633–640.

"Design of an Adaptive Fuzzy Logic Controller Using a Genetic Algorithm" by CL Karr, In Proc Int. Conf on Genetic Algorithms (ICGA '91), vol. 1, pp. 450–456, San Diego, CA 1991.

"Integrating Design States of Fuzzy Systems Using Genetic Algorithms", by MA Lee, et al, IEEE Trans. on Systems, Man and Cybernetics, vol. SMC–15, No. 1, 1985, pp.116–132.

Primary Examiner—Gary Chin
Attorney, Agent, or Firm—David C. Goldman; Jill M. Breedlove

[57] ABSTRACT

In this invention there is disclosed a system and method for tuning look-ahead error measurements that is used to improve the train handling performance of a rail-based transportation system. A look-ahead error module along with a fuzzy logic controller is synthesized to ensure that a train simulator complies to a prescribed speed limit over a specified track profile while providing a smooth ride. A genetic algorithm is used to adjust the parameters of the look-ahead error module.

16 Claims, 7 Drawing Sheets

SYSTEM AND METHOD FOR TUNING LOOK-AHEAD ERROR MEASUREMENTS IN A RAIL-BASED TRANSPORTATION HANDLING CONTROLLER

FIELD OF THE INVENTION

The present invention relates generally to rail-based transportation system handling controllers and more particularly to a system and method for tuning look-ahead error measurements in a rail-based transportation system handling controller.

BACKGROUND OF THE INVENTION

A rail-based transportation system such as a freight train typically comprises at least one locomotive and about one hundred rail-cars connected together by inter-car couplers. Most of the couplers that are currently used are connected to the rail-cars by a hydraulically damped spring. Since each of the couplers are connected to a hydraulically damped spring at opposite ends, there is a slack zone that allows the rail-cars to move relative to each other while in motion, allowing the train to change length by as much as 50–100 feet. For example, the slack zone will decrease to zero while the train is traveling downhill and using dynamic braking and will expand to its maximum length while the train is traveling uphill. The amount of movement allowed by the couplers depends on the handling of the locomotive controls. Typically, the couplers are subjected to two types of forces (i.e., static and dynamic) that may lead to breakage of the couplers, the brake pipe that prevents the rail-cars from banging in to each other, and the train. Accordingly, the train operator has to be careful in the handling of the locomotive controls so that these forces are not exceeded. In addition, the train operator has to control the locomotive so that the train travels within prescribed speed limits without excess acceleration and braking. Violation of the prescribed speed limits and excess acceleration and braking may lead to derailments and severe cargo damage. Therefore, it is imperative that the train operator handle the locomotive controls smoothly while staying within the prescribed speed limits.

Currently, most locomotives are equipped with only a very simplistic cruise control that uses a linear Proportional Integral (PI) controller. This type of cruise control can only be used below speeds of 10 mph and is primarily used for uniform loading and yard movement and cannot prescribe a braking action. In addition, this type of PI controller does not take into account the slack or distributed dynamics of the couplers in any manner and is not applicable for extended trains traveling at cruising speeds over a variety of terrain. Accordingly, there is a need for a train handling controller that can smoothly manage the slack of the couplers while keeping the train within prescribed speed limits over a varying terrain.

SUMMARY OF THE INVENTION

This invention has developed a system and method for tuning look-ahead error measurements in a rail-based transportation handling controller. The tuned look-ahead error measurements are used by the rail-based transportation handling controller to ensure that a rail-based transportation system complies with prescribed speed limits set for a specified track profile while providing a smooth ride.

In this invention, there is a velocity profiler containing a predetermined velocity profile for operating a rail-based transportation system over a specified track profile. In addition, there is a train simulator for simulating an operation of the rail-based transportation system over the specified track profile. A look-ahead error module, responsive to the velocity profiler and the train simulator, determines look-ahead error for the rail-based transportation system. A tuner, coupled to the train simulator and the look-ahead error module, optimizes look-ahead error measurements determined by the look-ahead error module. A fuzzy logic controller controls the handling of the train simulator in accordance with the look-ahead error measurements determined by the tuned look-ahead error module. In particular, the fuzzy logic controller tracks the look-ahead error and change in look-ahead error and provides a control action to the train simulator that minimizes the look-ahead error.

DESCRIPTION OF THE DRAWINGS

FIGS. 8$a$–8$d$ show the performance of a fuzzy logic PI controller for a rail-based transportation system before tuning and after tuning of look-ahead error parameters.

DETAILED DESCRIPTION OF THE INVENTION

Figure 1:
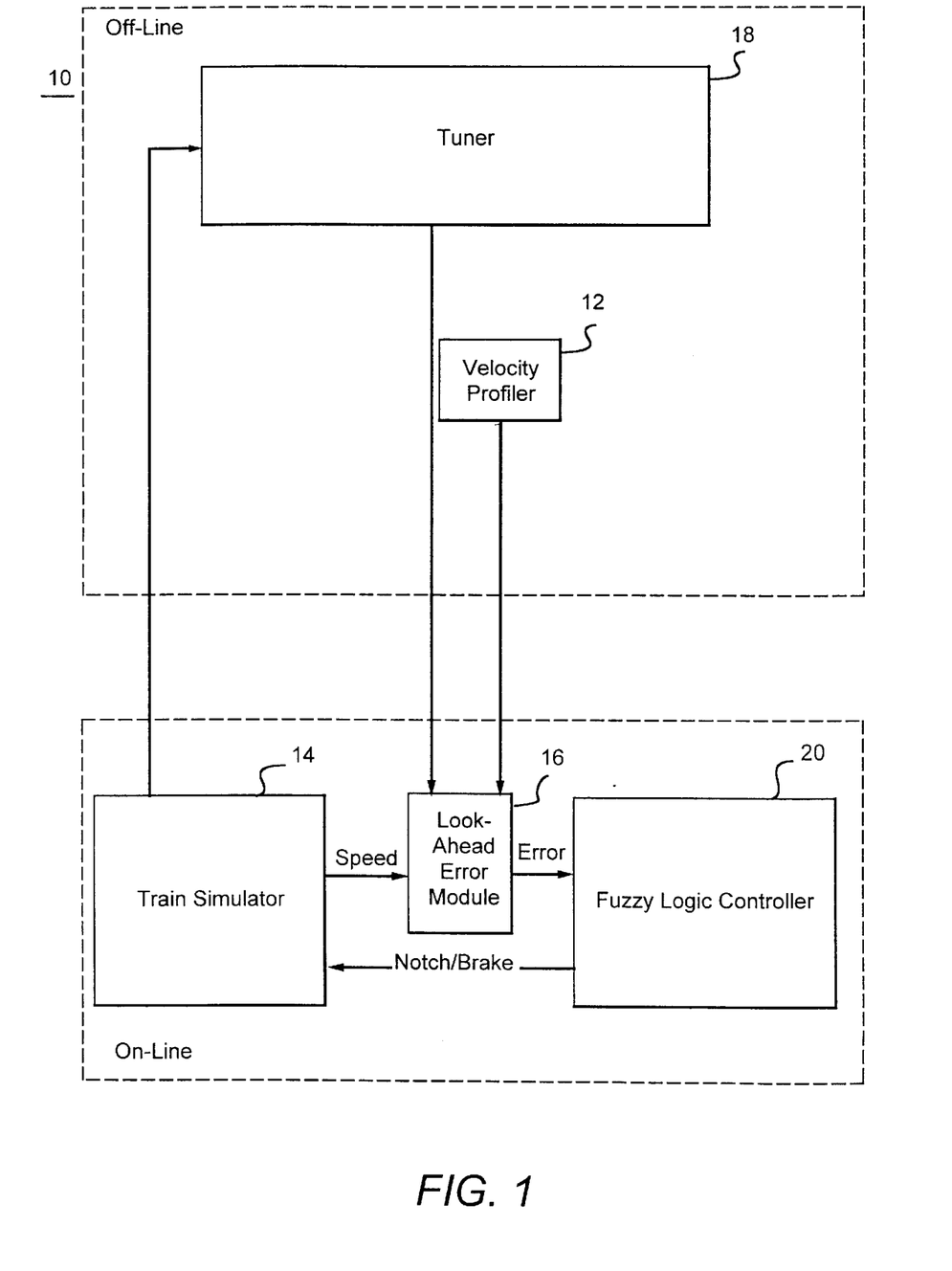
FIG. 1 shows a block diagram of a system for tuning look-ahead error measurements in a rail-based transportation handling controller according to this invention.

FIG. 1 shows a block diagram of a system 10 for tuning look-ahead error measurements in a rail-based transportation handling controller according to this invention. The system 10 includes a velocity profiler 12 that contains a predetermined velocity profile for operating a rail-based transportation system such as a freight train over a specified track profile. A train simulator 14 is used to simulate the operation of the train over the specified track profile. A look-ahead error module 16 compares the speed of the train simulator 14 at various locations of the specified track profile to the predetermined velocity that is stored within the velocity profiler 12 to determine the current error. In addition, the look-ahead error module 16 predicts the future velocity of the train simulator and uses it to determine the future error or the look-ahead error of the train. The look-ahead error module 16 sends an error signal corresponding to the look-ahead error between the speed of the train simulator 14 and the predetermined velocity profile. A tuner 18, coupled off-line to the train simulator 14 and the look-ahead error module 16, is used to tune the module's ability to determine the look-ahead error. A fuzzy logic controller 20 tracks the look-ahead error and change in look-ahead error to generate a control action to the train simulator 14 that minimizes the look-ahead error. In this invention, the control action is the modification of the throttle notch and brake settings.

In this invention, the velocity profiler 12 comprises a track profile of several different tracks. The track profile includes the grade of the track, the elevation of the track, the curvature of the track, the speed limits, as well as any landmarks, the grade crossings, bridges and so forth. In addition, the velocity profiler 12 comprises a train makeup of the train. The train makeup includes the number of rail-cars, the type of rail-cars, the position and lading of each rail-car, and the type of each locomotive in the consist. A train dynamics model uses the track profile and train makeup information to generate the acceleration of the train from a locomotive tractive or braking force, grade forces on the train, and resistance forces due to aerodynamic drag, track curvature, and wheel rail friction. An optimization algorithm optimizes the train dynamics model to find the function of the tractive effort versus position or time that results in the completion of the journey in a specified time with minimized fuel consumption. The result of the optimization algorithm is the optimal velocity profile for operating the train over the specified track profile.

In this invention, the train simulator 14 simulates the operation of the train based on three inputs, the locomotive characteristics, the train makeup and the track profile. The locomotive characteristics specify the tractive/braking effort available at a given velocity and notch setting. The locomotive characteristics also contains a specific fuel consumption table which are specific to each make of locomotive and can be varied suitably. The train makeup is comprised of a list of rail-cars and/or locomotives, arranged in sequential order within the train. The type of the car and the amount of lading has to be specified for each car. The empty weight and other physical characteristics of the rail-car such as cross-sectional area, Davis coefficients etc. are inferred from the car type, and are maintained in a separate database. The track profile comprises a list of mileposts along the specified track, with the distance from the starting point, the current grade in percent, curvature in degrees, and the speed limit in mph. The beginning and end of the journey is marked either by special milepost designations or by a speed limit of zero. The train simulator uses the above-noted inputs to generate outputs such as time in minutes, the throttle notch setting having a range from 0–8, the dynamic brake setting having a range from 0–8, the air brake setting in psi, the distance traveled in miles, the velocity in mph, the net acceleration in mph/min, the total cumulative fuel consumed in gallons, the net elevation in miles, the tractive effort in lb-ft, the total braking effort (dynamic+air) in lb-ft, the air brake effort in lb-ft, and the reference velocity in mph. This list of outputs is only illustrative of the possibilities and this invention is not limited thereto.

As mentioned above, the error look-ahead module 16 compares the speed of the train simulator 14 to the predetermined velocity as defined by the velocity profiler 12 to determine the current error. The current error e(s) is defined as:

$$e(s) = v(s) - v^*(s), \quad (1)$$

wherein v*(s) is the desired velocity at a point s along the trajectory of the velocity profile and v(s) is the actual current velocity at point s. In addition, the look-ahead error module 16 predicts the future velocity of the train simulator and uses it to determine the look-ahead error. The look-ahead error ê is defined as:

$$\hat{e}(s) = \sum_{i=0}^{l/\Delta s} (\hat{v}(s + i\Delta s) - v^*(s + i\Delta s))\alpha^i, \quad (2)$$

wherein v̂( ) is the projected velocity over a look-ahead distance l from the current position s as provided by the velocity profiler 12 and i is an index. In equation 2, the projected look-ahead errors are discounted by an exponentially decreasing weight such that an error over an incremental distance Δs further into the future is α times less important for tracking the profile. Thus, the incremental distance Δs and the weighting constant a together control the importance given to future tracking versus current tracking. In this invention, the look-ahead length l is nominally taken to be the length of the given train. In typical cases, the look-ahead length l may range between 1–2 miles, the incremental distance Δs equals 0.2 and the weighting constant α ranges from 0.1 to 0.9. In order to normalize the scale for error, it is desirable to normalize equation 2 such that the look-ahead error ê is defined as:

$$\hat{e}(s) = \sum_{i=0}^{l/\Delta s} (\hat{v}(s + i\Delta s) - v^*(s + i\Delta s)) \frac{\alpha^i}{\sum_j \alpha^j}, \quad (3)$$

wherein j is an index.

In equation 2, the projected velocity at any point Δs miles from the current position s is defined as:

$$\hat{v}(s + \Delta s) = \sqrt{v^2(s) + 2 \cdot a(s) \cdot \Delta s}, \quad (4)$$

wherein a(s) is the current acceleration of the train. This is an approximation since it assumes a constant acceleration over the look-ahead distance l. It is believed that this approximation may be a reasonable one for almost all of the train's journey, especially when it is in a negotiating mode, since acceleration changes are done gradually. On the other hand, this approximation may be too simplistic for fine control where the terrain has a significant effect.

In cases where the terrain does have a significant effect, a new computation of the look-ahead acceleration needs to be derived to take into account the difference of the grade force acting on the train between current and future terrains as provided by the specified track profile in the train simulator 14. In these cases, it is assumed that the train is a single block so that the slack motion is not taken into consideration. Therefore, the total force acting on the train $F_{total}$ is defined as:

$$F_{total} = F_t - F_b - F_r - F_g, \quad (5)$$

wherein $F_t$ and $F_b$ are the tractive and braking efforts, respectively, $F_r$ is the friction force, and $F_g$ is the grade force. In this invention, $F_t$, $F_b$ and $F_r$ are assumed to remain constant over a look-ahead distance. This is a reasonable approximation since $F_r$ is mainly a function of the train's velocity and it changes gradually due to its massive inertia. Thus, the total force acting on the train $F_{total}$ can be defined as:

$$F_{total} = F_{constant} - F_g \quad (6)$$

Using the equation of motion, the projected acceleration â at any point Δs from the current position s results in:

$$\hat{a}(s+\Delta s) = a(s) - \frac{\hat{F}_g(s+\Delta s) - F_g(s)}{m}, \quad (7)$$

wherein a(s) and F$_g$(s) are the current acceleration and grade force, respectively, m is the inertia, and â(s+Δs) and F̂$_g$(s+Δs) are the projected acceleration and grade force, respectively. Therefore, the projected velocity at any point Δs miles from the current position s is defined as:

$$\hat{v}(s+\Delta s) = \sqrt{v^2(s) + 2 \cdot \hat{a}(s+\Delta s) \cdot \Delta s}, \quad (8)$$

wherein v(s) is the current velocity of the train.

Figure 2:
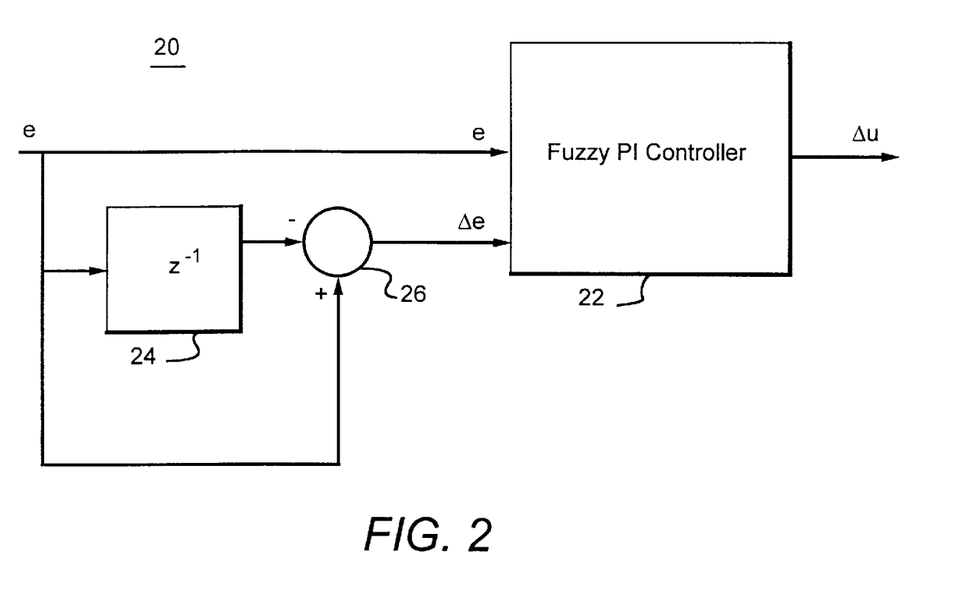
FIG. 2 shows a block diagram of a more detailed view of the fuzzy logic controller shown in FIG. 1.
Figure 3:
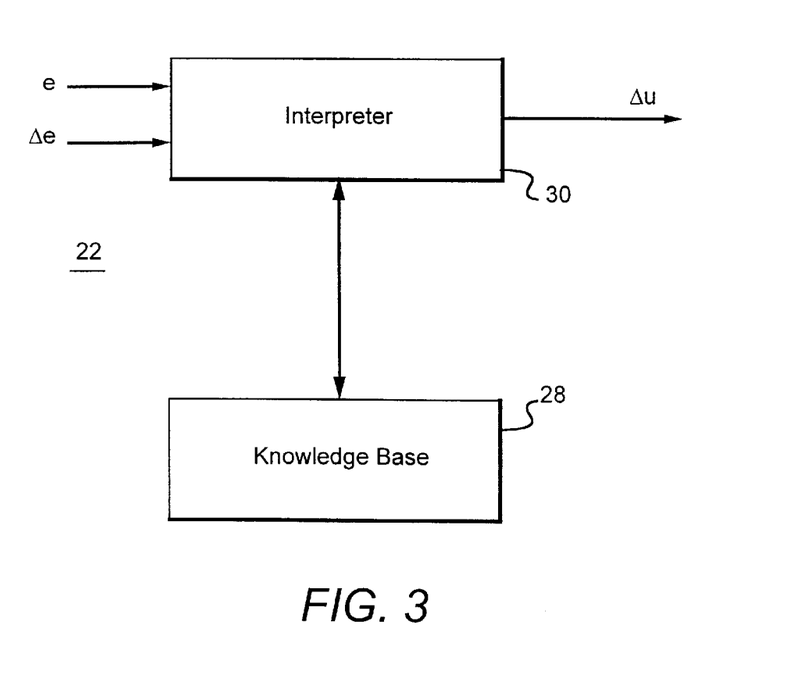
FIG. 3 shows a block diagram of a more detailed view of the fuzzy logic PI controller shown in FIG. 2.

As mentioned above, the fuzzy logic controller 20 uses the look-ahead error and change in look-ahead error to generate a control action to the train simulator 14 that minimizes the look-ahead error. FIG. 2 shows a block diagram of a more detailed view of the fuzzy logic controller 20. The fuzzy logic controller 20 comprises a fuzzy logic PI controller 22 that receives the look-ahead error e determined by the look-ahead module 16 and change in look-ahead error Δe as determined by a delay element (i.e., a sample and hold) 24 and a summer 26 to generate incremental control actions Δu. The fuzzy logic PI controller as shown in FIG. 3 comprises a knowledge base 28 having a rule set, term sets, and scaling factors. The rule set maps linguistic descriptions of state vectors such as e and Δe into the incremental control actions Δu; the term sets define the semantics of the linguistic values used in the rule sets; and the scaling factors determine the extremes of the numerical range of values for both the input (i.e., e and Δe) and the output (i.e., Δu) variables. An interpreter 30 is used to relate the error e and the change in error Δe to the control action Δu according to the scaling factors, term sets, and rule sets in the knowledge base 28.

Figure 4:
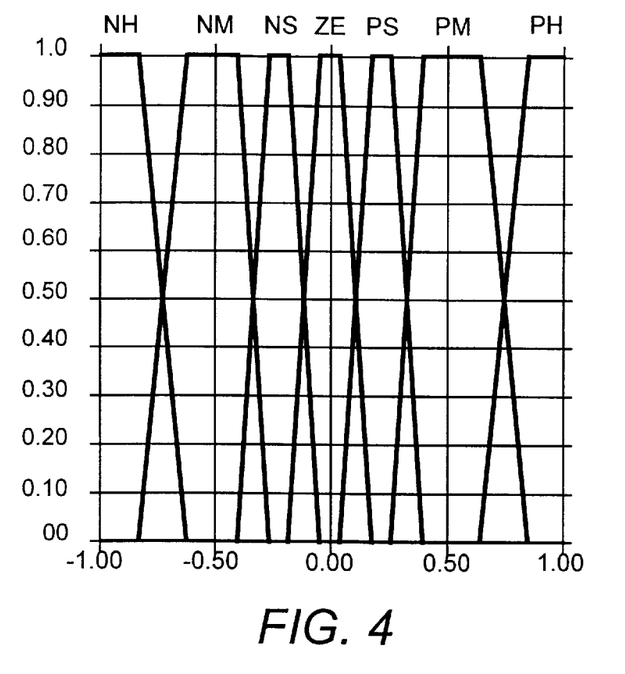
FIG. 4 shows an example of a fuzzy membership function used in this invention.

In this invention, each of the input variables (e and Δe) and the output variable (Δu) have a term set. The term sets are separated into sets of NH, NM, NL, ZE, PL, PM, PH, wherein N is negative, P is positive, H is high, M is medium, L is low, and ZE is zero. Accordingly, NH is negative high, NM is negative medium, NL is negative low, PL is positive low, PM is positive medium, and PH is positive high. Those skilled in the art will realize that there are other term sets that can be implemented with this invention. Each term set has a corresponding membership function that returns the degree of membership or belief, for a given value of the variable. Membership functions may be of any form, as long as the value that is returned is in the range of [0,1]. Initially, the terms are uniformly positioned trapezoids overlapping at a 50% level over the normalized universe of discourse as shown in FIG. 4.

Figure 5:
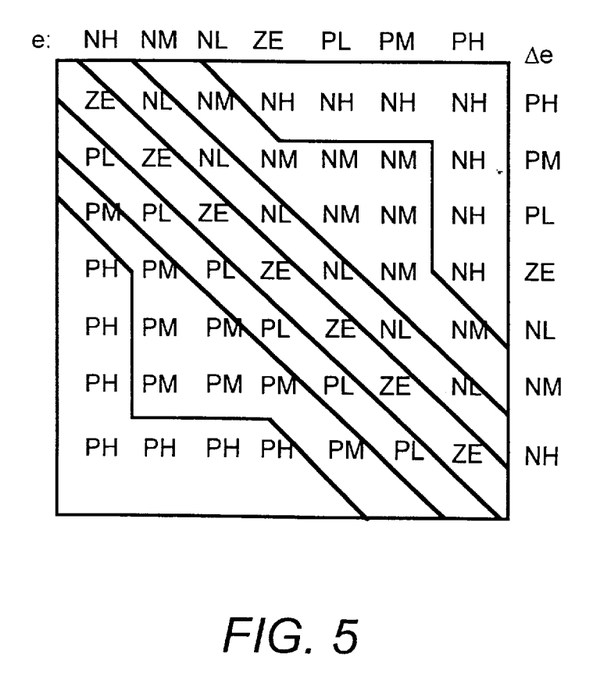
FIG. 5 shows an example of a rule set for the fuzzy logic PI controller.

An example of a rule set for the fuzzy logic PI controller 22 is shown in FIG. 5. As mentioned above, the rule set maps linguistic descriptions of the error e and the change in error Δe into the control action Δu. In FIG. 5, if e is NH and Δe is PH, then Δu will be ZE. Another example is if e is PL and Δe is NH, then Δu will be PM. Those skilled in the art will realize that there are other rule sets that can be implemented with this invention.

The relationship between the output variable u and the input variable e in the fuzzy logic PI controller 22 is expressed approximately as:

$$\frac{\Delta u(t)}{S_u} \approx \frac{\Delta e(t)}{S_d} + \frac{e(t)}{S_e}, \quad (9)$$

$$u(t) \approx \frac{S_u}{S_d} \cdot e(t) + \frac{S_u}{S_e} \cdot \int e(t), \quad (10)$$

$$-S_e \leq e(t) \leq S_e, \quad (11)$$

$$-S_d \leq \Delta e(t) \leq S_d, \quad (12)$$

$$-S_u \leq \Delta u(t) \leq S_u, \quad (13)$$

wherein S$_e$, S$_d$, S$_u$, are the scaling factors of the error e, the change of error Δe, and the incremental output variable Δu, respectively. The above relationship differs from a conventional PI controller which is defined as:

$$u(t) = K_p e(t) + K_i \int e(t) dt, \quad (14)$$

wherein K$_p$ and K$_i$ are the proportional and integral gain factors, respectively. Comparing the fuzzy logic PI controller of this invention with the conventional PI controller results in the following:

$$K_p \approx \frac{S_u}{S_d} \text{ and } K_i \approx \frac{S_u}{S_e} \cdot \left(\frac{1}{dt}\right) \quad (15)$$

As mentioned above, the performance of the look-ahead error module 16 is tuned by the tuner 18. In particular, the tuner 18 uses a genetic algorithm to adjust the parameters (i.e., α, Δs, l) in the look-ahead module 16. A genetic algorithm is the name of a technique that is used to find the best solutions to complex multivariable problems. In one sense, a genetic algorithm represents a focused and progressive form of trial and error. Essentially, a genetic algorithm is a computer program that solves search or optimization problems by simulating the process of evolution by natural selection. Regardless of the exact nature of the problem being solved, a typical genetic algorithm cycles through a series of steps. First, a population of potential solutions is generated. Solutions are discrete pieces of data which have the general shape (e.g., the same number of variables) as the answer to the problem being solved. These solutions can be easily handled by a digital computer. Often, the initial solutions are scattered at random throughout the search space.

Next, a problem-specific fitness function is applied to each solution in the population, so that the relative acceptability of the various solutions can be assessed. Next, solutions are selected to be used as parents of the next generation of solutions. Typically, as many parents are chosen as there are members in the initial population. The chance that a solution will be chosen to be a parent is related to the results of the fitness of that solution. Better solutions are more likely to be chosen as parents. Usually, the better solutions are chosen as parents multiple times, so that they will be the parents of multiple new solutions, while the poorer solutions are not chosen at all. The parent solutions are then formed into pairs. The pairs are often formed at random, but in some implementations dissimilar parents are matched to promote diversity in the children.

Each pair of parent solutions is used to produce two new children. Either a mutation operator is applied to each parent separately to yield one child from each parent, or the two parents are combined using a cross-over operator, producing two children which each have some similarity to both parents. Mutation operators are probabilistic operators that try to introduce needed solution features in populations of solutions that lack such a feature. Cross-over operators are deterministic operators that capture the best features of two parents and pass it on to new off-spring solutions. Cross-over operations generation after generation ultimately combines the building blocks of the optimal solution that have been discovered by successful members of the evolving population into one individual.

The members of the new child population are then evaluated by the fitness function. Since the children are modifications of the better solutions from the preceding population, some of the children may have better ratings than any of the parental solutions. The child population is then combined with the original population that the parents came from to produce a new population. One way of doing this, is to accept the best half of the solutions from the union of the child population and the source population. Thus, the total number of solutions stays the same, but the average rating can be expected to improve if superior children were produced. Note that any inferior children that were produced will be lost at this stage, and that superior children will become the parents of the next generation in the next step. This process continues until a satisfactory solution (i.e., a solution with an acceptable rating according to the fitness function) has been generated. Most often, the genetic algorithm ends when either a predetermined number of iterations has been completed, or when the average evaluation of the population has not improved after a large number of iterations.

In this invention, the tuner 18 uses an off-the-shelf genetic algorithm known as GENESIS (GENEtic Search Implementation System). All that is needed is the fitness function. This invention uses three fitness functions which are:

$$f_1 = \sum_i |notch_i - notch_{i-1}| + |brake_i - brake_{i-1}|, \quad (16)$$

$$f_2 = \sum_i |v_i - v_i^d|, \quad (17)$$

$$f_3 = w_1 \frac{\sum_i |notch_i - notch_{i-1}|}{K_1} + w_2 \frac{\sum_i |v_i - v_i^d|}{K_2}, \quad (18)$$

wherein $v^d$ denotes the desired velocity and i is a distance or milepost. The fitness function $f_1$ captures the throttle notch jockeying, the fitness function $f_2$ captures the speed profile tracking accuracy, and the fitness function $f_3$ combines the weighted sum of fitness functions $f_1$ and $f_2$.

Figure 6:
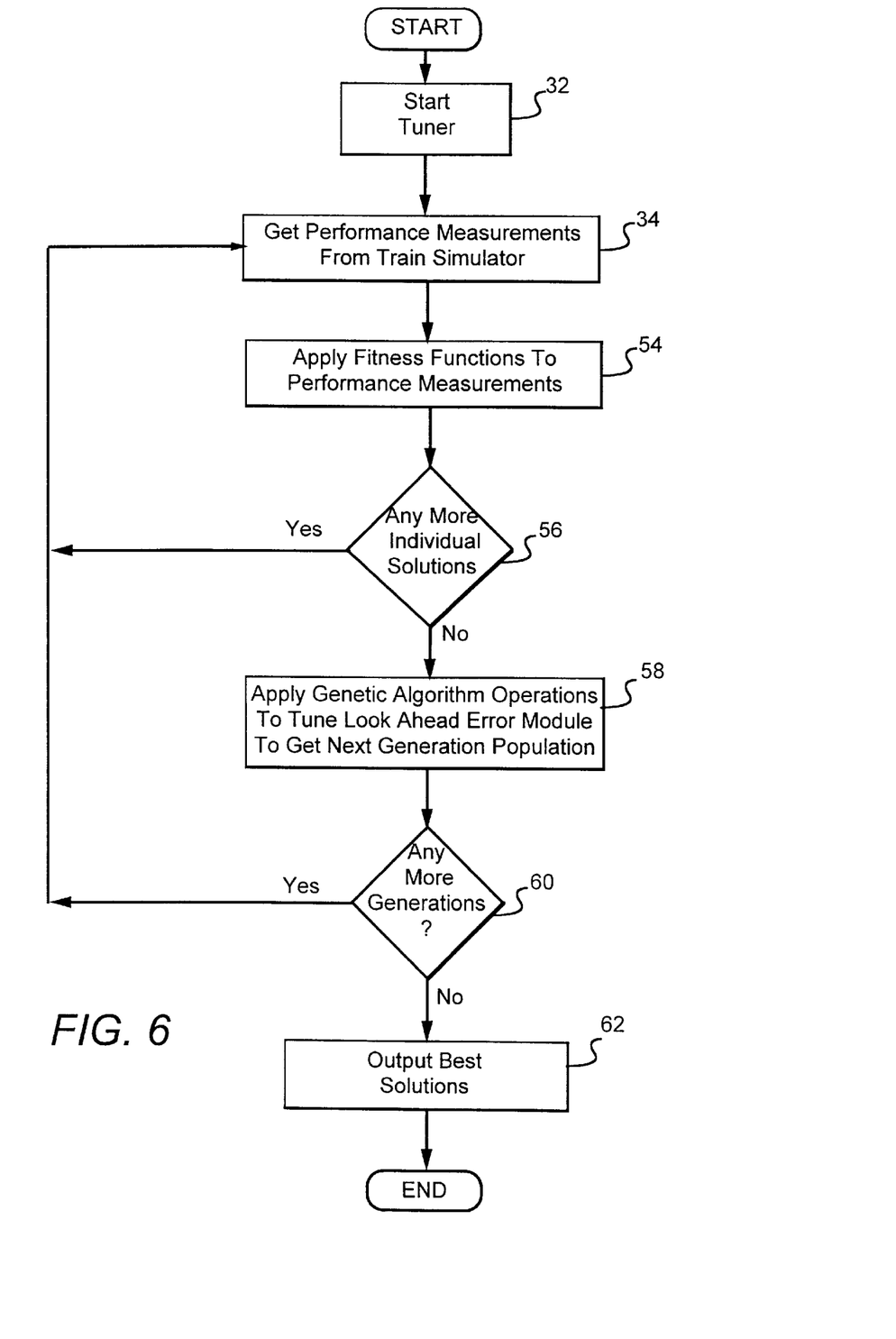
FIG. 6 shows a flow chart setting forth the processing steps performed by the tuner shown in FIG. 1.
Figure 7:
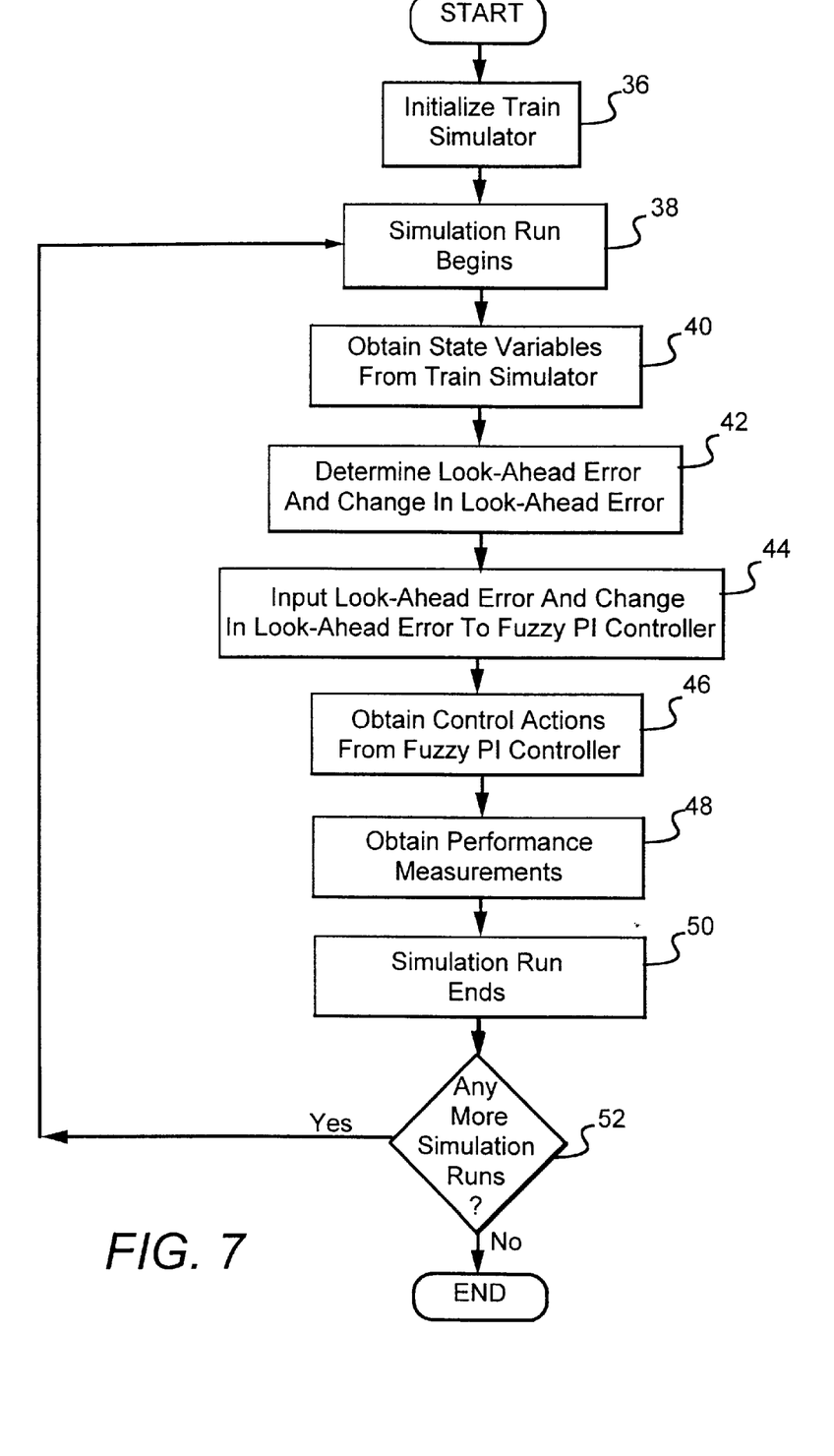
FIG. 7 shows a flow chart setting forth the processing steps in obtaining performance measurements.

FIG. 6 shows a flow chart setting forth the processing steps that are performed to tune the error look-ahead module 16. The tuner is started at 32 and performance measurements are retrieved at 34 from the train simulator. FIG. 7 shows how the performance measurements are obtained. Referring now to FIG. 7, the train simulator 14 is initialized for a journey over a specified track profile at 36. Next, a simulation run is begun at 38. At each simulator run, state variables are obtained from the train simulator at 40. In this invention, the state variables are the speed of the train simulator and the position of the simulator with respect to the specified track profile. The state variables are then inputted to the look-ahead error module at 42 to obtain the look-ahead error and the change in look-ahead error. Then both the look-ahead error and the change in look-ahead error are inputted to the fuzzy logic PI controller at 44. The fuzzy logic PI controller uses the inputted look-ahead error and change in look-ahead error to recommend a control action (i.e., a change in the throttle notch and braking settings) at 46. The performance of the train simulator 14 such as the fuel usage, the tracking of the look-ahead error, and throttle notch jockeying are then obtained at 48 and stored in a log. The simulation run then ends at 50. If it is determined that there are more simulation runs left in the journey at 52, then processing steps 38–52 are continued until there are no longer any more simulation runs. Once it is determined that there are no more simulation runs, then the performance measurements are ready to be tuned by the tuner 18.

Referring back to FIG. 6, after the performance measurements have been obtained from the train simulator, then the tuner 20 applies the fitness functions $f_1$, $f_2$, and $f_3$ to the measurements at 54 for a predetermined number of generations and individuals. The fitness functions $f_1$, $f_2$, and $f_3$ are applied until it has been determined at 56 that there are no more individuals left. Next, the genetic algorithm operations are applied at 58 to the look-ahead error module 16 to get the next generation population. The genetic algorithm parameters for this invention such as the population size, the cross-over rate, and the mutation rate are set such that the population size is 50, the cross-over rate is 0.6, and the mutation rate is 0.001.

The genetic algorithm operations are applied until it has been determined at 60 that there are no more generations. If there are more genetic algorithm generations, then additional performance measurements are obtained from the train simulator 14 in the same manner described for FIG. 7. Once the additional performance measurements are obtained, then steps 54–60 in FIG. 6 are repeated until there are no more generations. Once the genetic algorithms have been applied to all of the generations, then the tuner 18 outputs the best solutions to the look-ahead error module at 62.

Figure 8A:
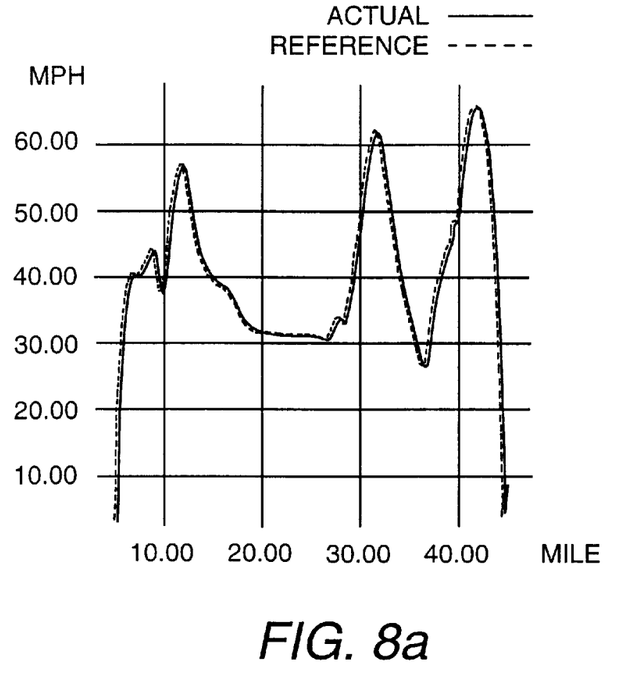
Figure 8B:
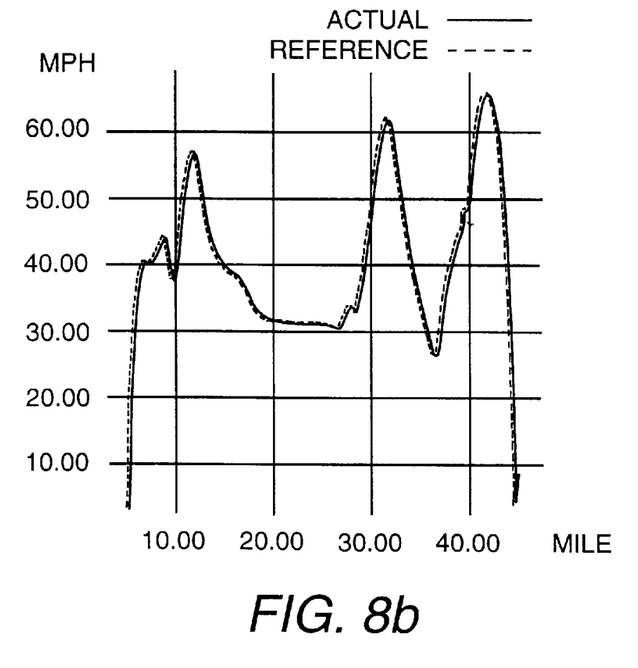
Figure 8C:
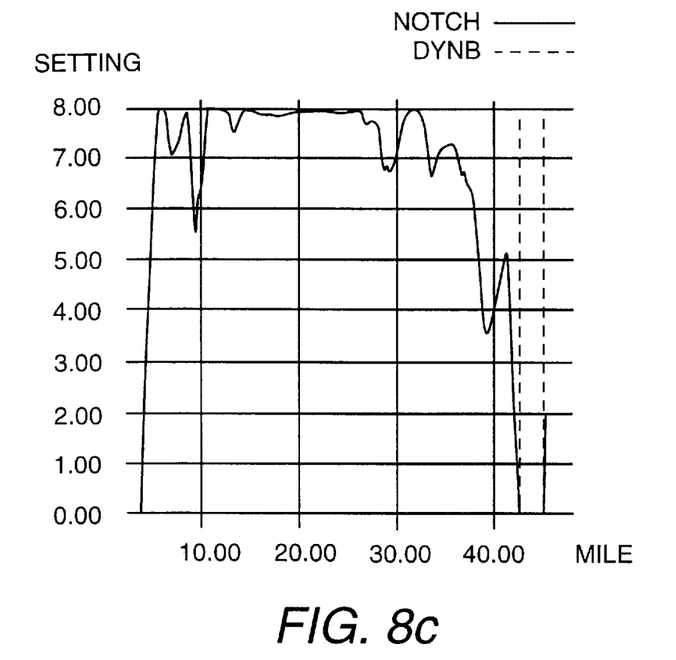
Figure 8D:
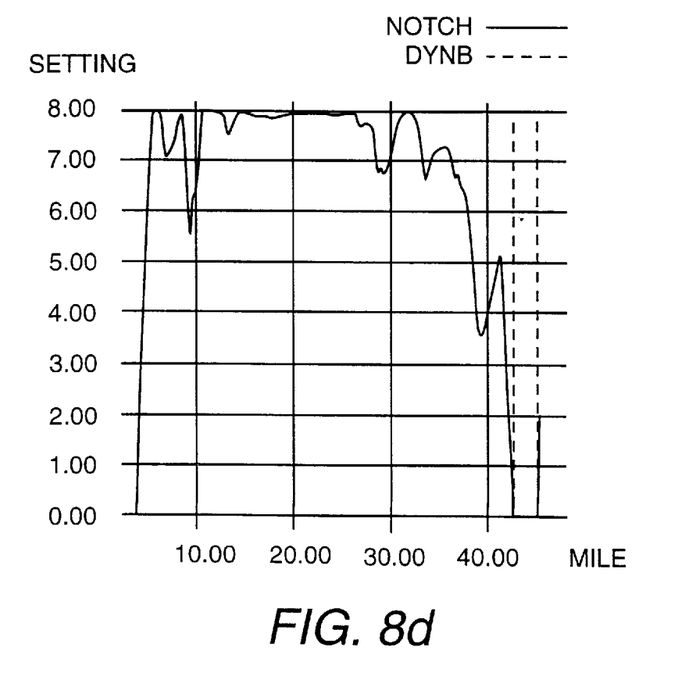

Tuning the look-ahead error parameters results in significant improvement in the fuzzy logic controller's ability to track error and to generate smooth control actions. FIGS. 8a–8d show the performance of a fuzzy logic PI controller for a rail-based transportation system before tuning and after tuning of the look-ahead error parameters. In particular, FIG. 8a shows the profile tracking of the fuzzy logic PI controller before tuning the look-ahead error parameters, while FIG. 8b shows the profile tracking after tuning. The tuned look-ahead error module results in an improvement in the tracking. FIG. 8c shows the control actions for the throttle notch and brake settings generated from the fuzzy logic PI controller before tuning the look-ahead error parameters, while FIG. 8d shows the throttle notch and brake settings after tuning.

It is therefore apparent that there has been provided in accordance with the present invention, a system and method for tuning look-ahead speed tracking error measurements in a rail-based transportation handling controller that fully satisfy the aims and advantages and objectives hereinbefore set forth. The invention has been described with reference to several embodiments, however, it will be appreciated that variations and modifications can be effected by a person of ordinary skill in the art without departing from the scope of the invention.

We claim:

1. A system for tuning look-ahead error measurements in a rail-based transportation handling controller, comprising:

a velocity profiler containing a predetermined velocity profile for operating a rail-based transportation system over a specified track profile;

a train simulator for simulating an operation of the rail-based transportation system over the specified track profile;

a look-ahead error module, responsive to the velocity profiler and the train simulator, for determining look-ahead error for the rail-based transportation system;

a tuner, coupled to the train simulator and the look-ahead error module, for optimizing said look-ahead error determined by the look-ahead error module; and a fuzzy logic controller for controlling the handling of the train simulator in accordance with said look-ahead error determined by the tuned look-ahead error module, the fuzzy logic controller tracking said look-ahead error and change in said look-ahead error and providing a control action to the train simulator that minimizes the look-ahead error.

2. The system according to claim 1, wherein the tuner comprises a plurality of fitness functions for evaluating the operating performance of the train simulator.

3. The system according to claim 2, wherein the tuner further comprises a genetic algorithm for tuning the parameters in the look-ahead error module according to the evaluations determined by the plurality of fitness functions.

4. The system according to claim 3, wherein the tuner further comprises an adjuster for adjusting the parameters in the look-ahead error module according to the optimization provided by the genetic algorithm.

5. The system according to claim 1, wherein the fuzzy logic controller comprises a fuzzy logic knowledge base comprising scaling factors, membership functions, and rule sets defined for the look-ahead error, the change in the look-ahead error, and the control action.

6. The system according to claim 5, wherein the fuzzy logic controller further comprises an interpreter for relating the look-ahead error and the change in the look-ahead error to the control action according to the scaling factors, membership functions, and rule sets in the fuzzy logic knowledge base.

7. The system according to claim 6, wherein the control action is used to modify throttle notch and brake settings for the train simulator.

8. The system according to claim 7, wherein the fuzzy logic controller is a fuzzy logic proportional integral controller.

9. A method for tuning look-ahead error measurements in a rail-based transportation handling controller, comprising the steps of:

providing a predetermined velocity profile for operating a rail-based transportation system over a specified track profile;

providing a train simulator to simulate an operation of the rail-based transportation system over the specified track profile;

using a look-ahead error module to determine look-ahead error for the rail-based transportation system according to the predetermined velocity profile and the simulated operation of the rail-based transportation system;

tuning the look-ahead error module to optimize said look-ahead error; and providing a fuzzy logic controller to control the handling of the train simulator in accordance with said look-ahead error determined by the tuned look-ahead error module, the fuzzy logic controller tracking said look-ahead error and change in said look-ahead error and providing a control action to the train simulator that minimizes the look-ahead error.

10. The method according to claim 9, wherein the step of tuning comprises using a plurality of fitness functions for evaluating the operating performance of the simulated operation.

11. The method according to claim 10, wherein the step of tuning further comprises using a genetic algorithm for tuning the parameters in the look-ahead error module according to the evaluations determined by the plurality of fitness functions.

12. The method according to claim 11, wherein the step of tuning further comprises adjusting the parameters in the look-ahead error module according to the optimization provided by the genetic algorithm.

13. The method according to claim 9, wherein the step of providing the fuzzy logic controller comprises providing a fuzzy logic knowledge base comprising scaling factors, membership functions, and rule sets defined for the look-ahead error, the change in the took-ahead error, and the control action.

14. The method according to claim 13, wherein the step of providing the fuzzy logic controller further comprises providing an interpreter for relating the look-ahead error and the change in the look-ahead error to the control action according to the scaling factors, membership functions, and rule sets in the fuzzy logic knowledge base.

15. The method according to claim 14, further comprising the step of using the control action to modify throttle notch and brake settings for the simulated operation.

16. The method according to claim 15, wherein the step of providing a fuzzy logic controller comprises providing a fuzzy logic proportional integral controller.

\* \* \* \* \*